(12) United States Patent
Allred et al.

(10) Patent No.: US 8,149,156 B1
(45) Date of Patent: Apr. 3, 2012

(54) SYSTEM AND METHOD FOR ESTIMATING LOCATION OF PROJECTILE SOURCE OR SHOOTER LOCATION

(75) Inventors: Rustin W. Allred, Plano, TX (US); Robert R. Bless, Melissa, TX (US)

(73) Assignee: Mustang Technology Group, L.P., Allen, TX (US)

( * ) Notice: Subject to any disclaimer, the term of this patent is extended or adjusted under 35 U.S.C. 154(b) by 385 days.

(21) Appl. No.: 12/468,620

(22) Filed: May 19, 2009

Related U.S. Application Data

(60) Provisional application No. 61/054,568, filed on May 20, 2008.

(51) Int. Cl.
*G01S 13/86* (2006.01)

(52) U.S. Cl. ............... 342/52; 342/56; 342/67; 342/97; 342/146; 342/147; 367/118; 367/128

(58) Field of Classification Search .............. 342/52, 342/56, 67, 90, 95–97, 133, 139–142, 146, 342/147; 367/118, 128
See application file for complete search history.

(56) References Cited

U.S. PATENT DOCUMENTS

| | | | | |
|---|---|---|---|---|
| 4,124,849 A * | 11/1978 | Zahornasky et al. | ........... | 342/67 |
| 5,140,329 A * | 8/1992 | Maughan et al. | ............... | 342/67 |
| 5,577,733 A * | 11/1996 | Downing | ....................... | 273/348 |
| 5,638,298 A * | 6/1997 | Edwards | ......................... | 73/167 |
| 5,781,505 A * | 7/1998 | Rowland | ....................... | 367/127 |
| 6,215,731 B1 * | 4/2001 | Smith | ............................ | 367/128 |
| 6,232,914 B1 * | 5/2001 | Rose | .............................. | 342/192 |
| 6,292,106 B1 * | 9/2001 | Solinsky et al. | ............... | 340/8.1 |
| 6,404,380 B2 * | 6/2002 | Poore, Jr. | ......................... | 342/96 |
| 6,621,764 B1 * | 9/2003 | Smith | ............................ | 367/128 |
| 6,922,059 B2 * | 7/2005 | Zank et al. | ..................... | 324/457 |
| 7,139,222 B1 * | 11/2006 | Baxter et al. | .................. | 367/127 |
| 7,233,545 B2 * | 6/2007 | Harvey et al. | ................. | 367/127 |
| 7,239,975 B2 * | 7/2007 | Coleman et al. | ............. | 702/153 |
| 7,266,042 B1 * | 9/2007 | Gent et al. | ..................... | 367/118 |
| 7,362,654 B2 * | 4/2008 | Bitton | ........................... | 367/127 |
| 7,609,156 B2 * | 10/2009 | Mullen | ..................... | 340/539.13 |
| 7,696,919 B2 * | 4/2010 | Moraites | ......................... | 342/14 |
| 7,952,513 B2 * | 5/2011 | Tietjen et al. | .................... | 342/52 |
| 8,036,065 B2 * | 10/2011 | Baxter et al. | .................. | 367/128 |
| 2005/0012657 A1 * | 1/2005 | Mohan | ........................... | 342/133 |
| 2006/0268663 A1 * | 11/2006 | Bitton | ........................... | 367/127 |
| 2008/0168895 A1 * | 7/2008 | Duong | ............................ | 89/1.1 |
| 2009/0174589 A1 * | 7/2009 | Moraites | ......................... | 342/14 |
| 2009/0295624 A1 * | 12/2009 | Tuxen | ........................... | 342/147 |
| 2009/0309781 A1 * | 12/2009 | Tietjen et al. | .................. | 342/52 |

* cited by examiner

*Primary Examiner* — John Sotomayor
(74) *Attorney, Agent, or Firm* — Anderson & Levine, LLP

(57) ABSTRACT

A system for estimating a location of the source of a projectile includes a radar system for transmitting a wave and detecting and providing an indication of a wave reflection from the projectile, an acoustic detection system for detecting and providing an indication of at least one sound associated with the projectile, and circuitry for estimating the location in response to the indication of a wave reflection and the indication of at least one sound.

34 Claims, 3 Drawing Sheets

SYSTEM AND METHOD FOR ESTIMATING LOCATION OF PROJECTILE SOURCE OR SHOOTER LOCATION

CROSS-REFERENCES TO RELATED APPLICATIONS

This application claims priority, and the benefit of the filing date, under 35 U.S.C. §119 of U.S. Provisional Application No. 61/054,568, filed May 20, 2008, and which is hereby incorporated herein by reference.

STATEMENT REGARDING FEDERALLY SPONSORED RESEARCH OR DEVELOPMENT

Not Applicable.

BACKGROUND OF THE INVENTION

The present embodiments relate to estimating a location of the source of a projectile, such as in the field of combat estimating the location of a shooter that has fired a projectile in a vicinity of, or toward, the estimating system.

In situations of violence including but not limited to military applications, typically a system is equipped with one or more weapons to allow retaliation in the direction of and against hostile fire. However, in complex combat situations there are often difficulties in determining the point of origin of the incoming projectiles so that this retaliation can be effected. Naturally, such a determination is important in quelling the hostility.

The prior art includes the use of an acoustical system to estimate the location of a projectile source such as the shooter of a bullet. In this approach, the acoustical system detects a shockwave that occurs due to the projectile passing in the vicinity of the acoustical system, and this shockwave is then associated with a projectile if the system also detects a subsequent sound if that sound is determined to be associated with the initial firing of the projectile, such as detecting the sound of a muzzle blast. In this system, however, the detection is only of supersonic projectiles, that is, where because the projectile is traveling faster than the speed of sound, the acoustical system is able to first detect the shockwave and thereafter to detect a corresponding muzzle blast. Indeed, if the acoustical system does not detect the subsequent muzzle blast, then the earlier-detected shockwave is disregarded by the system. In addition to its supersonic-detection-only operability, the accuracy of the results of the acoustical system in estimating the location of the origin of the projectile is sometimes unsatisfactory.

In view of the above, the prior art provides drawbacks and the preferred embodiments improve upon these drawbacks as demonstrated below.

BRIEF SUMMARY OF THE INVENTION

In a preferred embodiment, there is a system for estimating a location of the source of a projectile. The system comprises a radar system for transmitting a wave and detecting and providing an indication of a wave reflection from the projectile. The system also comprises an acoustic detection system for detecting and providing an indication of at least one sound associated with the projectile. Finally, the system comprises circuitry for estimating the location in response to the indication of a wave reflection and the indication of at least one sound.

Other aspects are also disclosed and claimed.

DETAILED DESCRIPTION OF THE INVENTION

The preferred embodiments are described below in connection with an example as integrated and implemented into a military vehicle, as the present inventors believe that this invention is well understood in such applications. However, the invention also may be implemented in, and provide significant benefit to, other systems that benefit by estimating a location of a source of a projectile such as a shooter and such systems may be integrated at a location or distributed among separate units that share information and benefit from the estimation and response thereto. Accordingly, it is to be understood that the following description is provided by way of example only and is not intended to limit the inventive scope.

Figure 1:
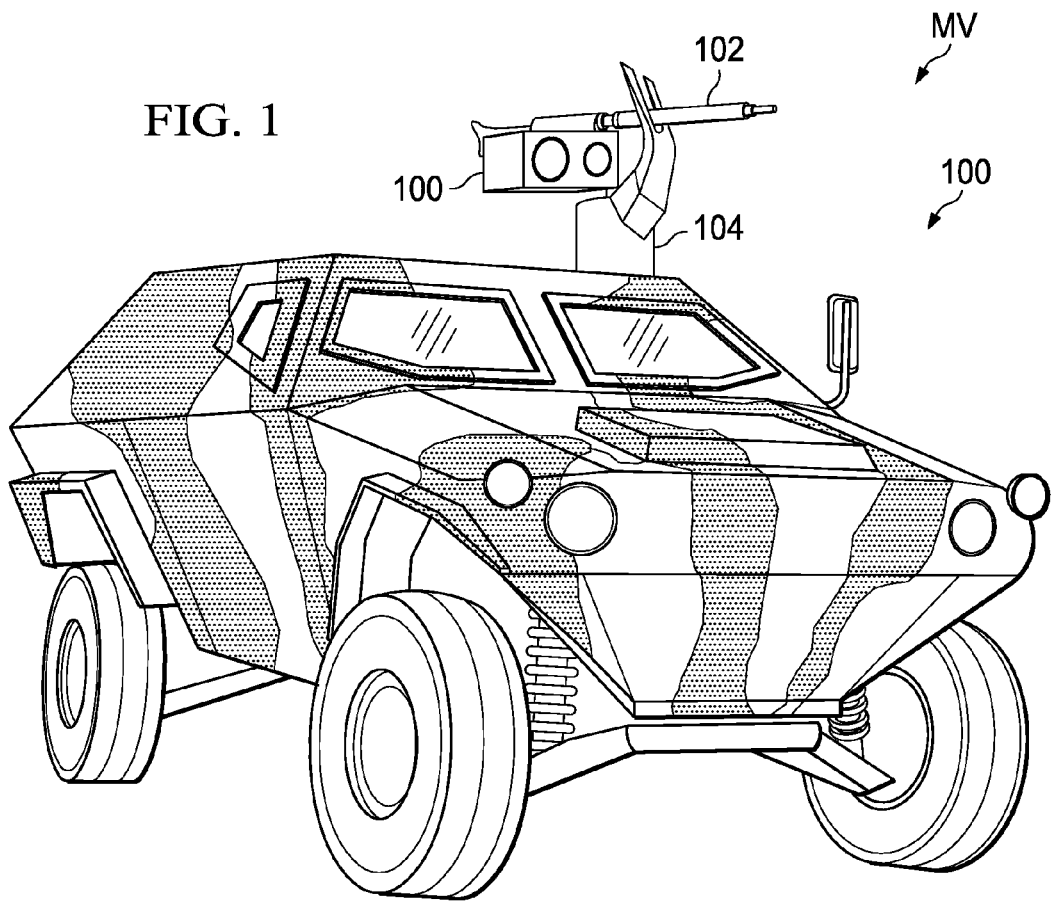
FIG. 1 illustrates various components of a retaliatory system, shown by way of example as a military vehicle, according to a preferred embodiment.

FIG. 1 illustrates various components of a retaliatory system, shown by way of example as a military vehicle MV, according to a preferred embodiment. Military vehicle MV of course includes various of the standard types of equipment in connection with such a vehicle, including proper apparatus as may be selected in the appropriate art for operating the vehicle to move and navigate the vehicle from place to place. Preferably military vehicle MV also includes sufficient apparatus for safely housing one or more occupants and materials within the interior of the vehicle, where such apparatus are not explicitly called out in the Figure but are understood to be used in the construction of such a vehicle. Also in connection with the preferred embodiments, military vehicle MV includes a weapon system 100, which may be of various types. Weapon system 100 includes a weapon 102 for firing ammunition or an appropriate response projectile at a hostile or other target. In a preferred embodiment, weapon 102 also is mounted or otherwise controlled by a slewing system 104 that includes one or more actuators and linkages that may be enabled to electromechanically guide, steer, or aim weapon 102 in either a coarse or fine direction toward its intended target. Enabling such guidance may be selected by an operator of weapon system 100 and the operator also may further guide weapon 102 manually either with or without the assistance of slewing system 104. Military vehicle MV also includes, or houses, an equipment system 200 not visible from the perspective of FIG. 1, but shown in block diagram as a system 200 in FIG. 2. System 200 typically is constructed with various electrical, electrical/mechanical, and/or computer hardware and software, as will be ascertainable by one skilled in the art, and is further explored below in connection with FIG. 2. Lastly, military vehicle MV also may include still other detecting and retaliatory systems, particularly for dangers that may not be perceived by system 200, which, for example, may include certain types of munitions (e.g., possibly RPGs) that are not detectable or sufficiently detectable by system 200 or that otherwise may be defeated by a different system.

Figure 2:
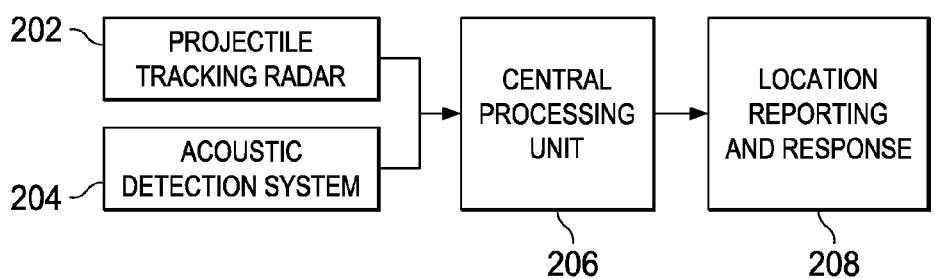
FIG. 2 illustrates a block diagram of a retaliatory system according to a preferred embodiment.

Looking more specifically to system 200 of FIG. 2 (and included but not shown in FIG. 1), system 200 includes a bullet (or other projectile) tracking radar 202, which in certain respects is known in the art and may be found in various implementations of modern hostile fire indicating systems (HFIS). In the prior art, tracking radar 202 is comprised of one or more radars and corresponding circuitry for detecting and thereby providing an estimated flight path of projectiles, such as mortar, rockets, rocket propelled grenades (RPG), and bullets, where these projectiles are fired in the vicinity or even in the direction of radar 202. In a preferred embodiment, however, and as detailed later, radar 202 is used in combination with an acoustic detection system 204 to identify not only attributes of an already-in-flight projectile, but collectively to estimate a location from which the projectile was launched (or otherwise fired or commenced its travel). In any event, in a preferred embodiment, radar 202 is a continuous wave (CW) radar, which generally therefore maintains a long or continuous wave transmission and monitors received return or reflections of a transmitted wave, thereby detecting various attributes in connection with the projectile that caused the reflection, as further detailed later.

Continuing with system 200 of FIG. 2 (again, included but not shown in FIG. 1), it also includes an acoustic detection system 204 that is preferably proximate radar 202 and is also separately known in the art and may be found in various HFIS implementations. Acoustic detection system 204, as its name suggests, is constructed and operable to detect certain acoustic events received by system 204, and in the preferred embodiment those events are anticipated to include any shockwave or other sound occurring as a result of a projectile passing by (or toward) system 204 as well as any muzzle (or other) sound of the firing of a projectile in the vicinity of system 204. Also in this regard, recall from the Background Of The Invention section of this document that the prior art includes supersonic detecting acoustic systems, or at least acoustic systems that disregard or discard a record of a detected shockwave that is not followed by a subsequent detected muzzle sound. In contrast, preferably system 204 either alone or as part of system 200 is responsive to both subsonic and supersonic signals and is operable to estimate a shooter location corresponding to each, as will be appreciated by one skilled in the art from the entirety of this document. Thus, for many if not most projectiles that could provide danger to system military vehicle MV, system 204 detects sounds associated with the initial firing of that projectile as well as the passage of such projectile near system 204.

According to a preferred embodiment, output information from both radar 202 and acoustic detection system 204 are both processed and thereby jointly combine to facilitate an estimate of a location of the source of a projectile, as extensively detailed later. By way of introduction, therefore, FIG. 2 illustrates that an output of radar 202 and an output of acoustic detection system 204 are both coupled to a central processing unit 206. Central processing unit 206 is intended to illustrate sufficient hardware and/or software for processing signals or data from both radar 202 and acoustic detection system 204 as detailed herein. Thus, such hardware and/or software may be in numerous forms including one or more circuits or integrated circuits including application-specific integrated circuits or processors (e.g., general purpose, dedicated, digital signal processor, CPU core, co-processors, and the like) as may be ascertained by one skilled in that art. Further, central processing unit 206 may include various ancillary and peripheral items and interfaces to support the functionality described herein as well as other related or unrelated functionality as may be performed by such a system. Accordingly, included or associated with central processing unit 206 may be input/output interface(s), peripheral functions (e.g., keyboard, mouse, display, speaker, etc.), and data storage and manipulation (e.g., memory, registers, soft and hard storage devices). In all events, system 206 is programmable by computer program instructions, typically or preferably received from a computer-readable medium that stores such instructions and in response to which the processes, methodology, and operations described herein are carried out by central processing unit 206. These computer instructions may be in the form of one or more executable programs, or in the form of source code or higher-level code from which one or more executable programs are derived, assembled, interpreted, or compiled. Any one of a number of computer languages or protocols may be used, depending on the manner in which the desired operations are to be performed. Moreover, in one preferred embodiment, central processing unit 206 as part of system 200 is included in or housed by the apparatus connected to and transportable by military vehicle MV although in an alternative embodiments the structure and/or functionality thereof may be performed at a location remote from military vehicle MV; in this regard, therefore, in such an alternative the outputs of both radar 202 and acoustic detection system 204 may be communicated from the location of military vehicle MV, via a wireless transmitter or other manner of communicating data, to a central processing unit 206 at a remote location, where such data may be processed as detailed below.

The output of central processing unit 206, that is, an estimated location of the source of a projectile, is coupled to a location reporting and response block 208. Block 208 represents in one embodiment the transformative result of the operation of system 200, having processed two articles, namely, (i) a tracked path of a projectile when it is in flight and (ii) one or more sounds associated with the firing and/or passage of the projectile in the air. In block 208, the transformative result invokes one or more preferred responses to the estimated location output of central processing unit 206, where a first response is storage of the result, such as in temporary or long term computer memory or storage. Another preferred response is to report the estimated location of the source of a projectile, where the report may take various forms. For example, in one preferred approach, the report is provided in a human-comprehensible form, such as by presenting either a visible or audible report, or both, to an operator within or near military vehicle MV; accordingly, in such an approach the report therefore may be presented to that operator via the above-mentioned display and/or speaker. Moreover, the report may be communicated to a location distant from military vehicle MV, again by way of some type of wireless or other communications. In another example of a preferred approach, in response to the transformative result, an occupant of military vehicle MV is assisted in guiding a weapon, such as weapon 102, in the direction of and at a proper trajectory toward the estimated location. Thus, in one approach, slewing system 104 is operated in response to the transformative result so as to slew weapon 102 to point in the direction of the estimated location of the source of the detected projectile, where this pointing may be in either coarse or more precise fashion and may be further augmented by manual adjustments of the weapon operator. Accordingly, weapon 102 may return fire toward the projectile source, either with or without the assistance of a human operator. In any event, therefore, from block 208 a responsive measure may be taken toward or in response to the source location of the detected projectile.

Figure 3:
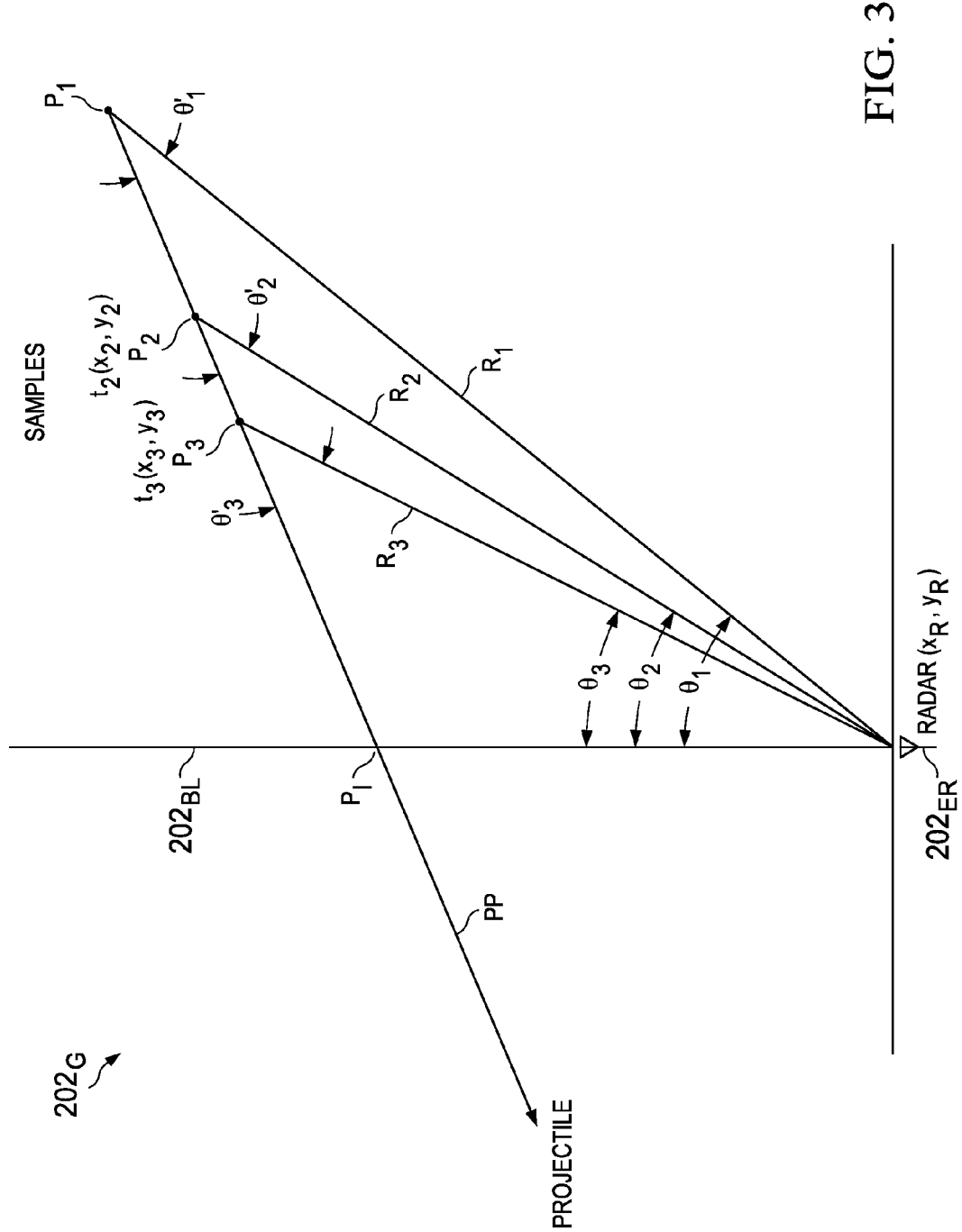
FIG. 3 illustrates, in association with tracking radar 202 of FIG. 2, a presentation geometry $202_G$.

FIG. 3 illustrates, in association with tracking radar 202 of FIG. 2, a presentation geometry $202_G$ so as to enable one skilled in the art an understanding of a portion of a preferred embodiment methodology as may be performed by system 200. For simplicity, the illustration is presented in a plane, ignoring elevation angle. However, elevation also can be sensed by radar 202 and the preferred embodiment methods described herein may be extended by one skilled in the art to that case. Geometry $202_G$ includes a radar emitter/receiver $202_{ER}$, which should be understood to be a detailed aspect of radar 202 and that is shown for simplicity at a single coordinate in the two-dimension plane of $(x_R, y_R)$. From radar emitter/receiver $202_{ER}$ emanates a boresight line $202_{BL}$ along which emitter/receiver $202_{ER}$ transmits waves and that, as known in the art and based on wave-interferometry principles, typically is provided by at least two antennas situated in close proximity to one another and to thereby provide appropriate signal diversity so as to properly respond to reflections of waves transmitted by the antennas. Thus, line $202_{BL}$ represents a projecting axis of wave signals that originate from a point $P_O$, at $(x_R, y_R)$, in association with and by radar emitter/receiver $202_{ER}$. Accordingly, if a projectile passes through boresight line $202_{BL}$, then reflections of the continuous wave from radar 202 are therefore received by radar emitter/receiver $202_{ER}$ as known in the art. To illustrate this effect, by way of an example a projectile path PP is shown in FIG. 3 that is intended to demonstrate a path, presumed linear in this example, along which a projectile is passing in the vicinity of radar 202. In the illustrated example, projectile path PP traverses FIG. 3 and intersects boresight line $202_{BL}$ at an intersection point, $P_I$. Thus, from the projectile/wave intersection, a reflection will be returned to and sensed by radar emitter/receiver $202_{ER}$.

In addition to the preceding, one skilled in the art will recognize that radar 202 (and its radar emitter/receiver $202_{ER}$) may perceive reflections outside of boresight line $202_{BL}$ in that the radar waves provide a beam pattern that is wider than a single line. Therefore, as a projectile passes through the radar's beam pattern, reflections are received by radar emitter/receiver $202_{ER}$. In the preferred embodiment, as in the art, radar emitter/receiver $202_{ER}$ is operable to sample those reflections and associate with them two parameters. A first of these parameters is a range rate of the projectile, where range rate is the component of the projectile velocity that is in the direction of the radar. For sake of convention in this document and as will be further understood later herein, the convention of $\dot{R}_x'$ is used to indicate a range rate of the projectile at a respective point $P_x$ relative to radar emitter/receiver $202_{ER}$; for example, therefore, the range rate at point $P_2$ is indicated as $\dot{R}_2'$. A second of these parameters is an angular offset from boresight line $202_{BL}$ to the point of the reflection (i.e., to the perceived location of the projectile when it was sampled); for example, therefore, the boresight-to-projectile distance angle at point $P_2$ is indicated as $\theta_2$. Some systems also will report range (i.e., distance), but this information is not necessary to certain preferred embodiments.

To further illustrate the above-introduced operation and the corresponding samples, FIG. 3 also illustrates examples of three such samples, occurring at times $t_1$, $t_2$, and $t_3$. More specifically, therefore, at time $t_1$, radar emitter/receiver $202_{ER}$ receives a reflection as the projectile passes along path PP at a time $t_1$, and in response thereto radar emitter/receiver $202_{ER}$ estimates a range rate ($\dot{R}_1'$, not shown), an angle $\theta_1$ between a range $R_1$ and boresight line $202_{BL}$ (hereafter, a boresight line-to-projectile distance angle), and optionally a range (or distance) $R_1$ to the point $P_1$ at which the reflection occurred; thus, in connection with time $t_1$ (and range $R_1$ and boresight line-to-projectile distance angle $\theta_1$), point $P_1$ may be associated with a coordinate, which from the simplified present example in two-dimensional space is shown as $(x_1, y_1)$. Similarly, at time $t_2$, radar emitter/receiver $202_{ER}$ receives a reflection as the projectile passes along path PP at a time $t_2$, and in response thereto radar emitter/receiver $202_{ER}$ estimates a range $R_2$ to the point $P_2$ at which the reflection occurred as well as a boresight line-to-projectile distance angle $\theta_2$ between range $R_2$ and boresight line $202_{BL}$, thereby associating with time $t_2$ and point $P_2$ a coordinate, which from the simplified two-dimensional example is shown as $(x_2, y_2)$. One skilled in the art will therefore readily appreciate comparable observations with respect to time $t_3$ and its respective point $P_3$ and coordinate $(x_3, y_3)$ as well as other respective times, points, and coordinates that may be established by radar emitter/receiver $202_{ER}$ along path PP.

It has been recognized in connection with the inventive preferred embodiments that additional methodology may be performed by system 200 in connection with the above-described methodology to estimate a location of the source of the projectile along path PP in FIG. 3. Particularly and as detailed later, a preferred embodiment estimates the origin of projectile path PP (i.e., the projectile firing location) in part in response to a set of one or more of the boresight line-to-projectile distance angles $\theta_x$, where those angles may be determined by a wave reflection at various sample points, including point $P_I$. And, more particularly and as detailed later, the projectile path PP origin is in part determined from a set of one or more projectile path-to-radar location angles, shown by ways of example in FIG. 3 as angles $\theta'_1$, $\theta'_2$, and $\theta'_3$, that is, each of these angles represents the angle between projectile path PP and the point $P_0$ (or coordinate $(x_R, y_R)$) of radar emitter/receiver $202_{ER}$. Accordingly, one aspect of the preferred methodology is providing the set of path-to-radar location angles (e.g., one or more of $\theta'_1$, $\theta'_2$, and $\theta'_3$) in response to other parameters of FIG. 3, and this aspect is detailed below.

Figure 4:
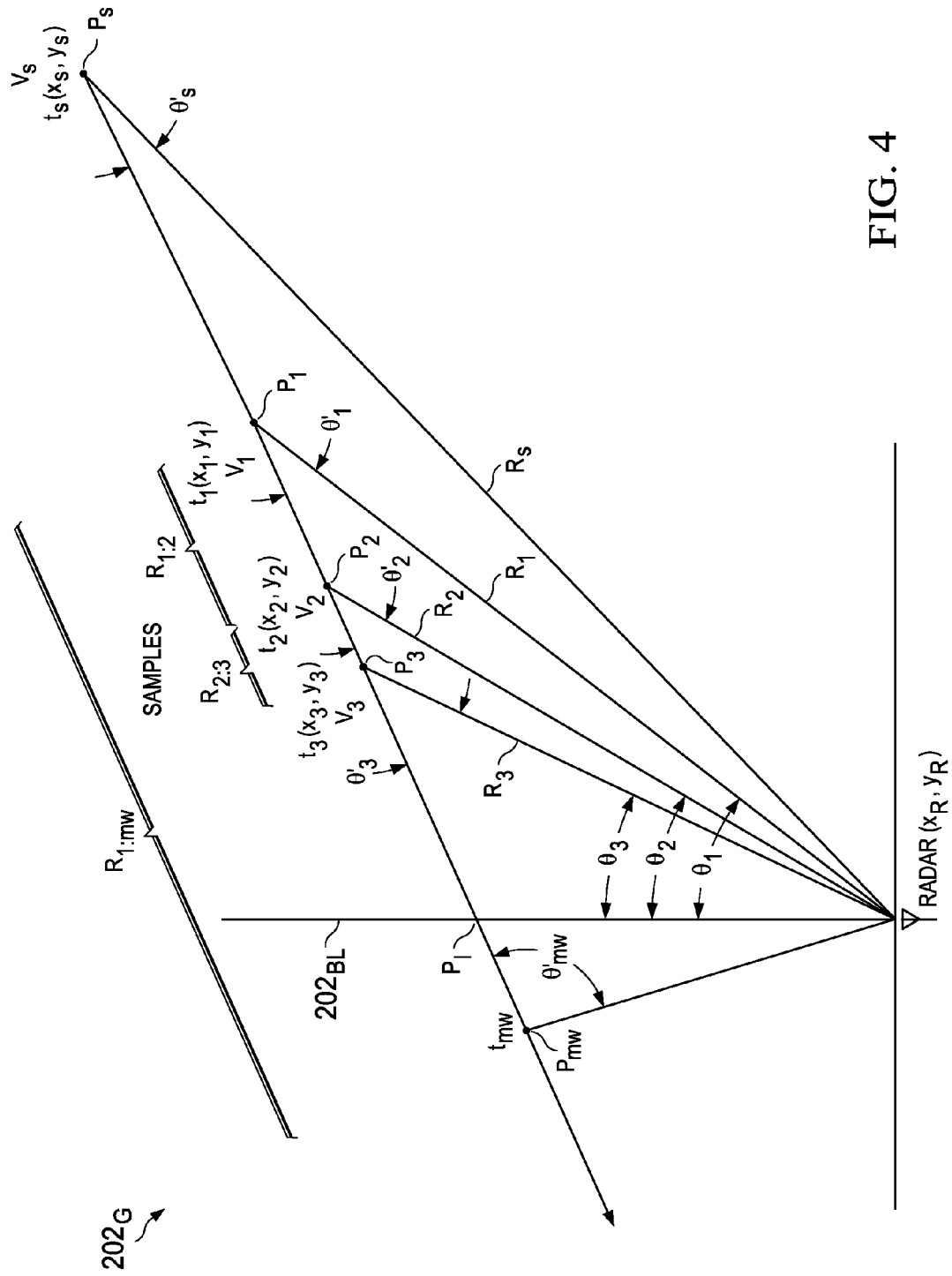
FIG. 4 illustrates the presentation geometry $202_G$ of FIG. 3 with additional aspects added thereto.

FIG. 4 again illustrates presentation geometry $202_G$ of FIG. 3 with various additional aspects included to enable one skilled in the art to further appreciate the following teachings, including the operability of the above-introduced acoustic detection system 204. In this regard, FIG. 4 illustrates two additional points along projectile path PP. A first illustrated point is point $P_s$, which is intended to illustrate the source location or point at which the projectile was first fired or otherwise launched; indeed, identification or estimation of the location of this point (e.g., $(x_s, y_s)$) is a desired result of the preferred embodiments. A second illustrated point is point $P_{nw}$, which is intended to illustrate the point along path PP at which the projectile is located (or would be if not interrupted) at a time, $t_{nw}$, when the muzzle wave or other sound associated with the launching of the projectile is received and detected by acoustic detection system 204. More specifically, recall earlier it was noted in connection with FIG. 2 that system 200 estimates a projectile launch (e.g., shooter) location in response to both tracking radar 202 and acoustic detection system 204, and below are now provided various details wherein the findings of both of those apparatus are combined to estimate point $P_s$. FIG. 4 also illustrates velocity values, where each velocity $v_x$ is the projectile velocity at its respective point $P_x$. Lastly, a range convention is introduced and shown in FIG. 4 to indicate a range or distance between different points, wherein the convention uses a subscript that lists the subscripts of the endpoints of the range separated by a colon. For example, therefore, a range $R_{1:2}$ is the range between point $P_1$ and point $P_2$. As another example, a range $R_{2:3}$ is the range between point $P_2$ and point $P_3$. As a final example, a range $R_{1:mw}$ is the range between point $P_1$ and point $P_{mw}$.

Attention is now directed to a preferred embodiment methodology wherein system 200 provides, in response to the boresight line-to-projectile distance angles of radar 202 (e.g., one or more of $\theta_1$, $\theta_2$, and $\theta_3$), the set of projectile path-to-radar location angles (e.g., one or more of $\theta'_1$, $\theta'_2$, and $\theta'_3$), where ultimately system 200 further uses those angles and acoustic detection system 204 to estimate the projectile path-to-radar location angle $\theta$'s and range $R_s$ to the source of the projectile (i.e., to in effect estimate point $P_S$). In connection with both the determination of the set of projectile path-to-radar location angles and the ultimate estimation of angle $\theta$'s and range $R_s$ corresponding to the source of the projectile, a known relationship is used as it defines a drag coefficient for the projectile, indicated as $\beta$, in the following Equation 1:

$$\beta = \frac{v_1 - v_2}{v_1 v_2 (t_2 - t_1)} \qquad \text{Equation 1}$$

Particularly and as shown later, when two projectile path-to-radar location angles (e.g., $\theta_1'$, $\theta_2'$) are determined or otherwise known, then respective velocities $v_1$ and $v_2$ may be determined and are used in connection with estimating angle $\theta_s'$ and range $R_s$. However, at this point in the discussion, recall that it is the boresight line-to-projectile distance angles (e.g., $\theta_1$, $\theta_2$) that are known from the operation of radar 202. Thus, Equation 1 establishes a relationship which, as shown later, further serves to define an additional relationship as between range distances in FIG. 4.

Next, the present inventors have recognized that the following relationships may be observed given presentation geometry $202_G$.

Each boresight line-to-projectile distance angle $\theta_x$ has a respective projectile path-to-radar location angle $\theta_x'$ that forms a triangle with a same third angle, such as at point $P_1$ where boresight line $202_{BL}$ intersects projectile path PP or at $\theta'_{mw}$; therefore, the following Equation 2 is defined by the triangle geometry:

$$\theta_1 + \theta_1' = \theta_2 + \theta_2' = \theta_3 + \theta_3' \qquad \text{Equation 2}$$

Trigonometry defines the following Equation 3:

$$R_{2:3}*\sin(180-\theta_3')*\sin(\theta_1-\theta_2) = R_{1:2}*\sin(\theta\,\sin(\theta_2-\theta_3)) \qquad \text{Equation 3}$$

Given Equation 2, the projectile path-to-radar location angles $\theta_1'$ and $\theta_2'$ can be solved for individually, as shown respectively in the following Equations 4 and 5:

$$\theta_1' = \theta_3 - \theta_1 + \theta_3' \qquad \text{Equation 4}$$

$$\theta_2' = \theta_3 - _2 + \theta_3' \qquad \text{Equation 5}$$

Further, trigonometric relationships also provide a solution for $\theta_3'$, as shown in the following Equation 6:

$$\theta_3' = \qquad \text{Equation 6}$$
$$-\tan^{-1}\left(\frac{R_{1:2}\sin(\theta_2 - \theta_3)\sin(\pi - \theta_1 + \theta_3)}{R_{1:2}\sin(\theta_2 - \theta_3)\cos(\pi - \theta_1 + \theta_3) + R_{2:3}\sin(\theta_1 - \theta_2)}\right)$$

At this point, recall that in association with the signaling and processing of radar 202, three sets of data are known or have been shown to be determinable, namely, the boresight line-to-projectile distance angle (e.g., $\theta_1$, $\theta_2$, $\theta_3$), the indication of time of the projectile along projectile path PP corresponding to that angle (e.g., $t_1$, $t_2$, $t_3$), and the range rate of the projectile in the direction of radar 202 corresponding to that angle or time (e.g., $\dot{R}_1'$, $\dot{R}_2'$, $\dot{R}_3'$). In addition, Equation 1 established the relationship of the projectile drag coefficient, $\beta$. Accordingly, it is recognized in connection with the present inventive scope that central processing unit 206 may solve for the respective projectile path-to-radar location angle $\theta_x'$, as shown below, in view of the following additional relationships:

$$R_{1:2} = \frac{1}{\beta}\ln\left(1 + \beta\frac{\dot{R}_1'}{\cos(\theta_1')}(t_2 - t_1)\right) \qquad \text{Equation 7}$$

$$R_{2:3} = \frac{1}{\beta}\ln\left(1 + \beta\frac{\dot{R}_2'}{\cos(\theta_2')}(t_3 - t_2)\right) \qquad \text{Equation 8}$$

$$v_i = \frac{\dot{R}_i'}{\cos(\theta_i')} \qquad \text{Equation 9}$$

$$v_1 = \frac{\dot{R}_1'}{\cos(\theta_1')} \qquad \text{Equation 10}$$

$$v_2 = \frac{\dot{R}_2'}{\cos(\theta_2')} \qquad \text{Equation 11}$$

According to a preferred embodiment, and given the determinations and relationships mentioned above, central processing unit 206 may now estimate the values of the thus-far unknown projectile path aligned values of $R_{1:2}$, $R_{2:3}$, and projectile path-to-radar location angles $\theta_1'$, $\theta_2'$, and $\theta_3'$, in view of the known values of $\theta_1$, $\theta_2$, $\theta_3$. In a preferred implementation, the unknown values are estimated by minimizing as shown in the following Equation 12:

$$\text{Equation 12}$$
$$\left\{\theta_3' + \tan^{-1}\left(\frac{R_{1:2}\sin(\theta_2 - \theta_3)\sin(\pi - \theta_1 + \theta_3)}{R_{1:2}\sin(\theta_2 - \theta_3)\cos(\pi - \theta_1 + \theta_3) + R_{2:3}\sin(\theta_1 - \theta_2)}\right)\right\} +$$
$$\{\theta_1' - \theta_3 + \theta_1 - \theta_3'\} + \{\theta_2' - \theta_3 + \theta_2 - \theta_3'\} = 0$$

Stated alternatively, Equation 12 may define a Cost function, where its unknowns are estimated by finding those values that when substituted therein approximate a solution of zero. Thus, Equation 12 may be re-stated in terms of minimizing a Cost of the absolute value of its addends, as shown in the following Equation 13.

$$\text{Equation 13}$$
$$\text{Cost} = \left|\theta_3' + \tan^{-1}\left(\frac{R_{1:2}\sin(\theta_2 - \theta_3)\sin(\pi - \theta_1 + \theta_3)}{R_{1:2}\sin(\theta_2 - \theta_3)\cos(\pi - \theta_1 + \theta_3) + R_{2:3}\sin(\theta_1 - \theta_2)}\right)\right| +$$
$$|\theta_1' - \theta_3 + \theta_1 - \theta_3'| + |\theta_2' - \theta_3 + \theta_2 - \theta_3'|$$

Accordingly, in a preferred embodiment, central processing unit 206 executes a search routine to minimize the Cost function of Equation 13. This search routine may be programmed and performed according to the known Simplex Optimization method or by various other known or ascertainable optimization functions in that art. In any event, therefore, upon optimizing Equation 13, system 200 has at that point determined the projectile path-to-radar location angles of $\theta'_1$, $\theta'_2$, and $\theta'_3$.

Attention is now directed to a preferred embodiment methodology wherein central processing unit 206 provides, in response to the set of projectile path-to-radar location angles (e.g., two or more of $\theta'_1$, $\theta'_2$, and $\theta'_3$), and further in response to acoustic detection system 204, an estimate of the projectile path-to-radar location angle $\theta'_s$ and range $R_s$, both pertaining to the location of the source of the projectile. In a preferred embodiment, values are used from detections of radar 202 of the projectile along path PP at two different times, so using the above convention and illustrations of FIGS. 3 and 4 these are illustrated by example at times $t_1$ and $t_2$. Recall that at those times respective range rates $\dot{R}_1'$ and $\dot{R}_2'$ are determined, and above it has been shown that by conclusion of Equation 13 values are estimated for respective projectile path-to-radar location angles $\theta'_1$ and $\theta'_2$. Next, at each time $t_1$ and $t_2$, a corresponding value of velocity $v_1$ and $v_2$ is derived from each corresponding range rate projectile path-to-radar location angle.

Continuing with the methodology and now having velocities $v_1$ and $v_2$, recall from Equation 1 above (re-stated below for the convenience of the reader) that the projectile drag coefficient value, $\beta$, may be estimated given the values of such velocities:

$$\beta = \frac{v_1 - v_2}{v_1 v_2 (t_2 - t_1)} \qquad \text{Equation 1}$$

Note also that the Equation 1 estimate may be smoothed by using more than two measurements, and such smoothing, as would be ascertained by one skilled in the art, is comprehended as part of the present inventive scope. However, as in the present example as demonstrated, it is also possible to characterize $\beta$ using only two velocity values.

Continuing with the methodology and now having the projectile drag coefficient value, $\beta$, the projectile velocity profile can be recreated by system 200 using the following Equation 14, in terms of the yet unknown initial velocity, $v_i$:

$$v(t) = \frac{v_i}{1 + \beta v_i t} \qquad \text{Equation 14}$$

Equation 14 represents that once a projectile is fired it has a changing velocity for different velocities along a projectile path, at different respective times, and the velocity profile is expected to decelerate as the projectile passes along its flight path. This profile, therefore, represents in-flight behavior, but in connection with the present inventive scope it is also recognized that the profile by itself does not indicate the initial velocity, $v_i$; in other words, if measurements are taken for example at two (or more) points along a projectile path PP, then the velocity profile at and between those points may be estimated, but the origin of the velocity, that is the initial velocity $v_i$, and the corresponding point at which that origin velocity commenced, is not directly ascertainable solely from the profile since there is no way to know when the radar began tracking the projectile relative to the time the projectile was first launched or fired.

In accordance with a preferred embodiment, acoustic detection system 204, proximate radar 202, detects the muzzle wave (or other sound) associated with the original firing of the projectile and records the detected time, $t_{mw}$. Note that with only this acoustic information it is not possible to determine whether the projectile was fired nearby or farther away. However, a preferred embodiment correlates this acoustically-sensed muzzle blast with the projectile's velocity profile as discussed above in connection with Equation 14, from which as shown below the shooter range, $R_s$, can be estimated. Note also that at time $t_{mw}$, the projectile velocity, optionally may be determined per the above methodology, although as shown below this is not necessary (and indeed, by time $t_{mw}$ the projectile may have already ceased along projectile path PP and thus may not be detectable via radar 202).

Next, central processing unit 206 determines a range, $R_{1:2}$, between points $P_1$ and $P_2$ and a range, $R_{1:mw}$, between points $P_1$ and $P_{mw}$ by the following respective Equations 15 and 16:

$$R_{1:2} = \frac{-1}{\beta} \ln(1 - \beta \cdot v_2 \cdot [t_2 - t_1]) \qquad \text{Equation 15}$$

$$R_{1:mw} = \frac{1}{\beta} \ln(1 + \beta \cdot v_1 \cdot [t_{mw} - t_1]) \qquad \text{Equation 16}$$

Note that Equation 16, and its determined result of $R_{1:mw}$, includes or is therefore responsive to the time $t_{mw}$ detected by acoustic detection system 204 and recorded as mentioned above. Note also that there are two forms presented by Equation 15 and 16: the first one for looking back from sample point 2, the second for looking forward from sample point 1.

With the ranges $R_{1:2}$ and $R_{1:mw}$, along with other values established earlier, central processing unit 206 determines several other values according to the following Equations that are also observed in connection with the present inventive scope:

$$R_{2:mw} = R_{1:mw} - R_{1:2} \qquad \text{Equation 17}$$

$$R_{1:R} = \frac{R_{1:2} \sin(\pi - \theta'_2)}{\sin(\theta'_2 - \theta'_1)} \qquad \text{Equation 18}$$

$$R_{2:R} = \frac{R_{1:2} \sin \theta'_1}{\sin(\theta'_2 - \theta'_1)} \qquad \text{Equation 19}$$

Note that in Equations 18 and 19, each range is from a respective point $P_1$ or $P_2$ to the radar location, the latter indicated by the subscript "R" as shown in the radar coordinates $(x_R, y_R)$ of FIGS. 3 and 4. Similar conventions are used in Equations 20 and 21 with respect to the range between point (or the projected point of the profile at the time $t_{mw}$) and the radar location.

$$R_{R:mw} = \sqrt{R_{1:mw}^2 + R_{1:R}^2 - 2R_{1:mw}R_{1:R}\cos\theta'_1} \qquad \text{Equation 20}$$

$$\theta'_{mw} = \sin^{-1}\left(\frac{R_{1:R}\sin\theta'_1}{R_{R:mw}}\right) \qquad \text{Equation 21}$$

$$v_{mw} = \frac{v_2}{1 + \beta v_2(t_{mw} - t_2)} \qquad \text{Equation 22}$$

Note that the velocity value, $v_{mw}$, computed from Equation 22 is the velocity of the projectile at the time the muzzle wave reaches the radar. Thus, although this value is used in the calculation, as mentioned above it is not necessary that it is measured directly by radar 202, or even that the projectile still be traveling at time $t_{mw}$. Instead, per Equation 22, central processing unit 206 may estimate that velocity based upon the reconstructed velocity profile as shown.

With the information that has been derived as shown hereinabove, central processing unit 206 determines an estimate of the projectile launch (i.e., shooter location). Preferably, this is accomplished by simultaneously solving a geometric equation for range based upon the radar measurements, along with the range based upon the speed of sound—hence, as noted throughout, in response to both tracking radar 202 and an acoustic detection system 204. Specifically, when processing unit 206 determines a point on the velocity profile v(t) that provides a range from which the projectile could have been fired to produce the detected muzzle wave (i.e., at time $t_{mw}$), the solution has been found. In a preferred embodiment, the Equations to be solved are non-linear and difficult to solve in closed form. However, in accordance with a preferred embodiment it is recognized it may be solved more efficiently using minimization techniques such as the Nelder-Mead Simplex method. Accordingly, the range to the shooter, $R_s$, that minimizes the following cost function is the desired result, as shown in the following Equation 23, where the term $S_S$ is the speed of sound:

$$\text{Cost} = \left| R_s \sin \frac{\left( \pi - \theta'_{mw} - \sin^{-1}\left[\frac{R_{mw:R}\sin\theta'_{mw}}{R_s}\right] \right)}{\sin\theta'_{mw}} + \frac{1}{\beta}\ln\left[1 - \beta v_{mw}\frac{R_s}{S_s}\right] \right| \qquad \text{Equation 23}$$

Moreover, having determined $R_s$, a preferred embodiment determines the projectile path-to-radar location angle of the shooter, $\theta'_S$, with the following Equation 24:

$$\theta'_S = \sin^{-1}\left(\frac{R_{2:R}\sin(\pi - \theta'_2)}{R_s}\right) \qquad \text{Equation 24}$$

From Equations 23 and 24, one skilled in the art will now appreciate that central processing unit 206 has determined (or estimated) $R_s$ and $\theta'_S$, thereby yielding sufficient information to identify the location from which the detected projectile was launched. Recall from earlier that this information is coupled to a location reporting and response block 208 to invokes one more responses, which may include preparing for and performing a retaliatory response.

From the preceding, it may be appreciated that the preferred embodiments provide apparatus and methodology for determining an estimate of a location of the source of a projectile such as in the field of combat. In a preferred embodiment, the determination is in response to both radar and acoustic detection apparatus. Moreover, the preferred embodiment provides numerous benefits, including advantages over the prior art. For example, note that certain apparatus described herein may be already included in various systems aboard a combat or related type vehicle and as a result the preferred embodiment may be incorporated without the need for additional hardware or with limited changes therein. Moreover, the preferred embodiment is believed to provide better accuracy as compared to prior art acoustic detection approaches. Still further, there is potential reduction in the complexity of existing acoustic-only bullet source detection systems. As still another benefit, the prior art acoustic-only bullet source detection systems may be constrained to estimation of shooter location only in response to projectiles that are detected at supersonic speeds, whereas in contrast the preferred embodiment provides its projectile source estimation in response to projectiles traveling at either supersonic or subsonic rates. As yet another benefit, the preferred embodiment may be incorporated into numerous other apparatus and may be implemented in various fashions. For example, while system 200 has been to shown to include various apparatus, such apparatus may be separated or distributed at different locations. Moreover, central processing unit 206 may be coupled to numerous other devices and provide functionality ancillary to or otherwise beneficial to military vehicle MV or any other site with which it is associated. As still another example, the above description is by way of example where one skilled in the art may ascertain its application to other vehicles, facilities, or sites. In all events therefore, various alternatives have been provided according to preferred embodiments, and still others may be ascertained by one skilled in the art. Given the preceding, therefore, one skilled in the art should further appreciate that while the present embodiments have been described in detail, various substitutions, modifications or alterations could be made to the descriptions set forth above without departing from the inventive scope, as is defined by the following claims.

The invention claimed is:

1. A system for estimating a location of the source of a projectile, comprising:
   a radar system for transmitting a wave and detecting and providing an indication of a wave reflection from the projectile;
   an acoustic detection system for detecting and providing an indication of at least one sound associated with the projectile; and
   circuitry for estimating the location in response to the indication of a wave reflection and the indication of at least one sound;
   wherein the radar system comprises circuitry for transmitting the wave along a boresight line
   and further comprising circuitry for providing a set of boresight line-to-projectile distance angles, wherein each boresight line-to-projectile distance angle in the set comprises an angle between the boresight line and a range distance to the projectile at a respective time;
   wherein the projectile passes along a projectile path; and
   further comprising circuitry for providing a set of projectile path-to-radar location angles, wherein each projectile path-to-radar location angle in the set comprises an angle between the projectile path and a location of the radar system.

2. The system of claim 1 wherein the circuitry for providing a set of projectile path-to-radar location angles is responsive to the set of boresight line-to-projectile distance angles.

3. The system of claim 1 wherein the circuitry for providing a set a projectile path-to-radar location angles provides further in response to at least two distances along the projectile path.

4. The system of claim 1 wherein the circuitry for providing a set a projectile path-to-radar location angles provides further in response to optimizing a cost function.

5. The system of claim 1 wherein the circuitry for providing a set of projectile path-to-radar location angles is responsive to:
   the set of boresight line-to-projectile distance angles;
   at least two distances along the projectile path; and
   optimizing a cost function.

6. The system of claim 1 wherein the circuitry for estimating estimates the location further in response to the set of projectile path-to-radar location angles.

7. The system of claim 6 and further comprising circuitry for determining a drag coefficient of the projectile in response to a first velocity of the projectile at a first time and a second velocity of the projectile at a second time, wherein the first velocity and the second velocity are determined in response to the radar system.

8. The system of claim 7 wherein the circuitry for determining the drag coefficient is further responsive to more than two velocities.

9. The system of claim 1 and further comprising:
a weapon; and
apparatus for guiding a firing direction of the weapon in response to the estimated location.

10. The system of claim 1 and further comprising apparatus for presenting a report of the estimated location in a human-comprehensible form.

11. The system of claim 1 wherein the radar system comprises a continuous wave radar system.

12. The system of claim 1:
wherein the acoustic detection system is operable to detect the at least one sound in response to either a subsonic projectile or a supersonic projectile; and
the circuitry for estimating the location in response to the indication of a wave reflection is for estimating the location of either the subsonic projectile or the supersonic projectile.

13. The system of claim 1 and further comprising a vehicle, wherein the radar system, the acoustic detection system, and the circuitry for estimating are housed by the vehicle.

14. A system for estimating a location of the source of a projectile, comprising:
a radar system for transmitting a wave and detecting and providing an indication of a wave reflection from the projectile;
an acoustic detection system for detecting and providing an indication of at least one sound associated with the projectile; and
circuitry for estimating the location in response to the indication of a wave reflection and the indication of at least one sound; and
wherein the estimating the location estimates in response to optimizing a cost function.

15. The system of claim 14 wherein the cost function comprises a projectile path-to-radar location angle corresponding to an anticipated location of the projectile along a path at a time when the acoustic detection system detects a launching sound of the projectile.

16. The system of claim 14 and further comprising:
a weapon; and
apparatus for guiding a firing direction of the weapon in response to the estimated location.

17. The system of claim 14 and further comprising apparatus for presenting a report of the estimated location in a human-comprehensible form.

18. The system of claim 14 wherein the radar system comprises a continuous wave radar system.

19. The system of claim 14:
wherein the acoustic detection system is operable to detect the at least one sound in response to either a subsonic projectile or a supersonic projectile; and
the circuitry for estimating the location in response to the indication of a wave reflection is for estimating the location of either the subsonic projectile or the supersonic projectile.

20. The system of claim 14 and further comprising a vehicle, wherein the radar system, the acoustic detection system, and the circuitry for estimating are housed by the vehicle.

21. A method of estimating a location of the source of a projectile, comprising:

transmitting a wave and detecting and providing an indication of a wave reflection from the projectile;
detecting and providing an indication of at least one sound associated with the projectile; and
estimating the location in response to the indication of a wave reflection and the indication of at least one sound;
wherein the transmitting step transmits along a boresight line;
and further comprising providing a set of boresight line-to-projectile distance angles, wherein each boresight line-to-projectile distance angle in the set comprises an angle between the boresight line and a range distance to the projectile at a respective time;
wherein the projectile passes along a projectile path; and
further comprising providing a set of projectile path-to-radar location angles, wherein each projectile path-to-radar location angle in the set comprises an angle between the projectile path and a location of the radar system.

22. The method of claim 21 wherein the step of providing a set of projectile path-to-radar location angles is responsive to the set of boresight line-to-projectile distance angles.

23. The method of claim 21 wherein the step of providing a set a projectile path-to-radar location angles provides further in response to at least two distances along the projectile path.

24. The method of claim 21 wherein the step of providing a set a projectile path-to-radar location angles provides further in response to optimizing a cost function.

25. The method of claim 21 wherein the step of providing a set of projectile path-to-radar location angles is responsive to:
the set of boresight line-to-projectile distance angles;
at least two distances along the projectile path; and
optimizing a cost function.

26. The method of claim 21 wherein the step of estimating estimates the location further in response to the set of projectile path-to-radar location angles.

27. The method of claim 21 and further comprising guiding a firing direction of a weapon in response to the estimated location.

28. The method of claim 21 and further comprising presenting a report of the estimated location in a human-comprehensible form.

29. The method of claim 21 wherein the estimating step is for estimating the location of either a subsonic projectile or a supersonic projectile.

30. A method of estimating a location of the source of a projectile, comprising:
transmitting a wave and detecting and providing an indication of a wave reflection from the projectile;
detecting and providing an indication of at least one sound associated with the projectile; and
estimating the location in response to the indication of a wave reflection and the indication of at least one sound; and
wherein the estimating step estimates in response to optimizing a cost function.

31. The method of claim 30 wherein the cost function comprises a projectile path-to-radar location angle corresponding to an anticipated location of the projectile along a path at a time when a launching sound of the projectile is detected.

32. The method of claim 30 and further comprising guiding a firing direction of a weapon in response to the estimated location.

33. The method of claim 30 and further comprising presenting a report of the estimated location in a human-comprehensible form.

34. The method of claim 30 wherein the estimating step is for estimating the location of either a subsonic projectile or a supersonic projectile.

* * * * *